Oct. 11, 1955   J. M. FELTON   2,720,574
BONDING MEMBERS HAVING IRREGULARITIES
Filed March 1, 1951   2 Sheets-Sheet 1
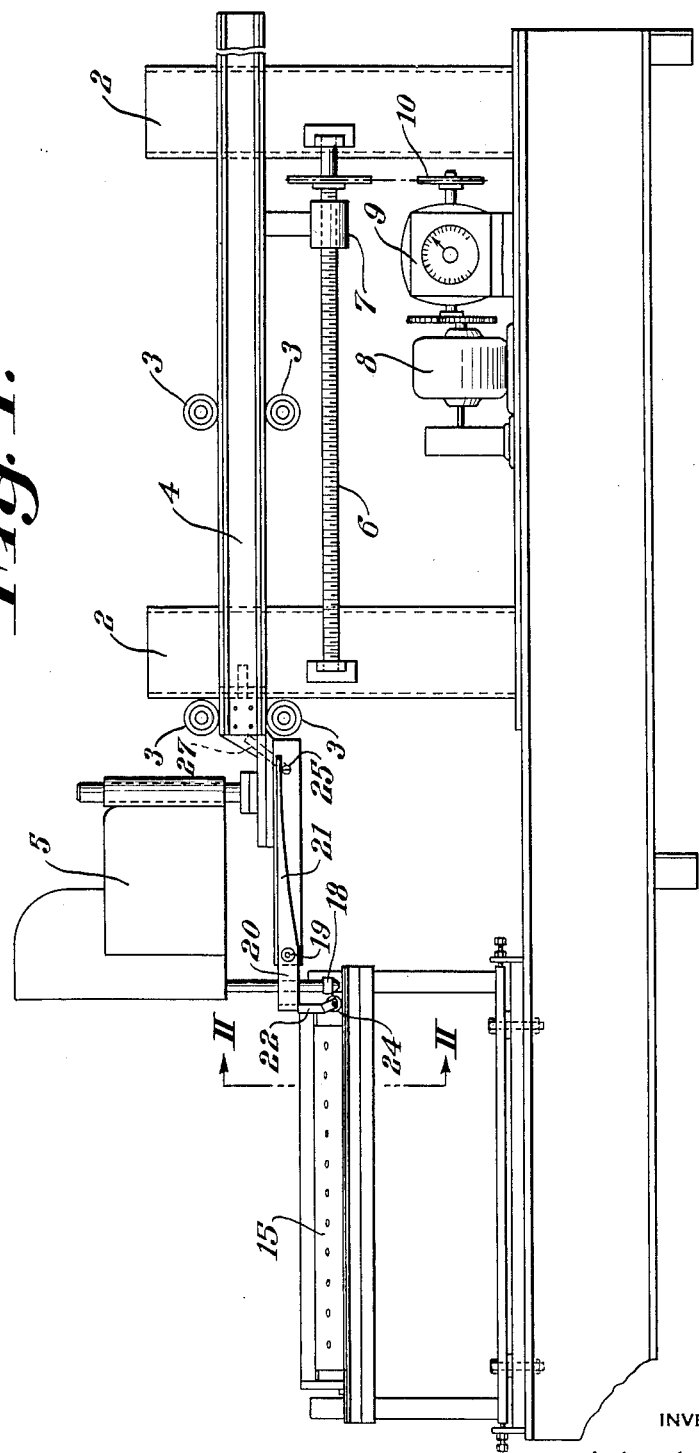
INVENTOR
John M. Felton Oct. 11, 1955 J. M. FELTON 2,720,574
BONDING MEMBERS HAVING IRREGULARITIES
Filed March 1, 1951 2 Sheets-Sheet 2
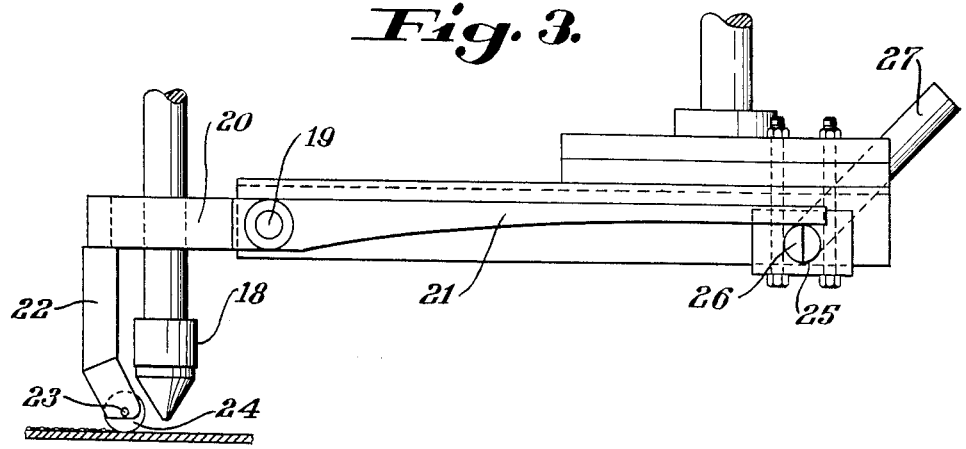
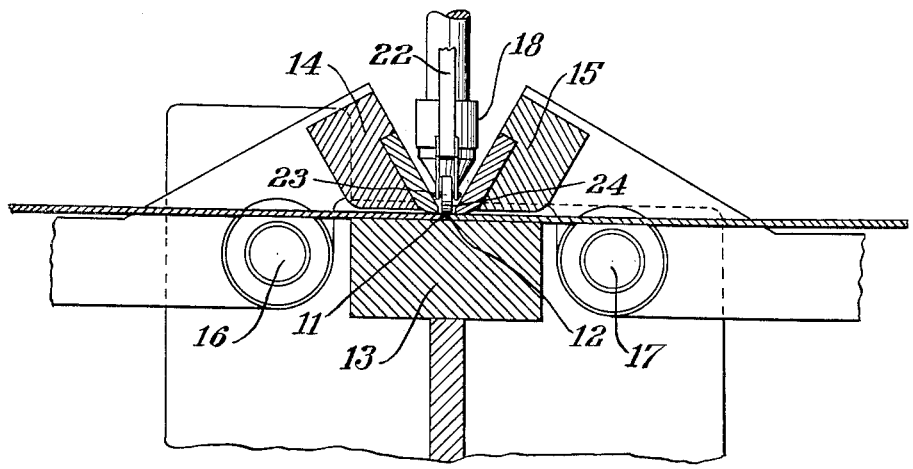
INVENTOR
John M. Felton United States Patent Office 2,720,574
Patented Oct. 11, 1955

2,720,574

BONDING MEMBERS HAVING IRREGULARITIES

John M. Felton, Wellsburg, W. Va., assignor to Wheeling Steel Corporation, Wheeling, W. Va., a corporation of Delaware Application March 1, 1951, Serial No. 213,439

4 Claims. (Cl. 219—10)

This invention relates to bonding members having irregularities. It has to do with the reduction of irregularities in one or more of a plurality of members to be bonded together while the member or members having the irregularities is or are maintained in position for bonding.

While the invention is of broad scope it has utility in the welding together of sheared sheet edges having projecting shear fins. The shear fins are an example of the irregularities herein referred to which may also take other forms. I am concerned with any irregularities in the work interfering with formation of a proper uniform bond.

For purposes of explanation and illustration the invention will be described and shown as embodied and practiced in apparatus for and a method of welding together sheared sheet edges having projecting shear fins.

When sheared sheet edges having projecting shear fins are welded together the shear fins interfere with the uniformity of the weld and may at times prevent the formation of an adequate weld or may necessitate costly finishing operations after welding such as trimming of the weld. Irregularities such as shear fins are especially disadvantageous when the edges having the irregularities are electrically welded together.

I have solved the problem by applying pressure to reduce the irregularities while the work is in position for bonding but prior to bonding. I provide a method of bonding together members at least one of which has irregularities at the portion thereof to be bonded to another member comprising positioning a member having such irregularities at a bonding station, applying pressure to reduce the irregularities, positioning another member to be bonded to the first-mentioned member at the bonding station in contiguous relationship with the first-mentioned member and bonding together the thus positioned members with the irregularities of the first-mentioned member reduced. I preferably assemble the members in contiguous relationship, with the members thus assembled apply pressure to reduce the irregularities and thereafter bond the members together. However, if only one of the members has irregularities at the portion thereof to be bonded to another member the irregularities of that member may be reduced before the member to which it is to be bonded is positioned at the bonding station; or, if both members have irregularities the first member may be positioned at the bonding station and its irregularities then reduced whereafter the other member may be positioned at the bonding station and its irregularities then reduced, after which the members may be bonded together.

In the case of sheets, normally both edges to be welded or otherwise bonded together are sheared edges having projecting shear fins, and in that case the preferred procedure is to fasten the sheets in position at the bonding station with the edges in contiguous relationship and with the sheets thus fastened apply pressure to reduce the shear fins and thereafter bond the edges together.

I preferably operate on the work progressively along the joint between the members to be bonded together to reduce the irregularities and bond the members together. Desirably the irregularities are reduced by being rolled down. In a preferred method the members to be bonded together are assembled in contiguous relationship whereafter the irregularities along the joint are progressively rolled down and simultaneously following the rolling the members are progressively bonded together. When applying my invention to the welding together of sheared sheet edges having projecting shear fins I desirably assemble the edges in contiguous relationship and with the edges thus assembled progressively roll down the shear fins along the joint between the edges and simultaneously after such rolling progressively weld the edges together.

I also provide apparatus for bonding together members at least one of which has irregularities at the portion thereof to be bonded to another member comprising work holding means for maintaining the members in contiguous relationship at a bonding station, means acting on at least the member having the irregularities to apply pressure thereto to reduce the irregularities while the member is maintained in position at the bonding station and means for bonding the members together. I desirably utilize a roller movable along and acting on at least the member having the irregularities to apply pressure thereto to reduce the irregularities.

I preferably provide an operating head movable along the joint between the members at the bonding station, the head having means for progressively reducing the irregularities and thereafter bonding the members together as the head moves along the joint. The operating head may when the work is to be bonded by welding comprise a welder head movable along the joint, the head having welding means and means disposed in advance of the welding means in the operative direction of the movement of the head along the joint bearing on the work to reduce irregularities in the work at the joint. Such means may comprise a roller bearing on the work. The roller is preferably separate from the welding means.

Means are preferably provided for selectively positioning the roller (1) to bear on the work and roll down irregularities in the work at the joint and (2) out of contact with the work, whereby the roller may be rendered operative during movement of the head in one direction and inoperative during movement of the head in the opposite direction. I preferably provide means including manually operable control means for moving the roller between operative and inoperative positions. In a preferred form of structure I provide a carrier pivoted to the welder head, a roller carried by the carrier adapted when operative to bear on the work and roll down irregularities in the work at the joint and manually operable control means for pivotally moving the carrier to move the roller between operative and inoperative positions.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same in which:

Figure 1 is an elevational view of apparatus for welding together sheared sheet edges having projecting shear fins;

Figure 2 is an enlarged cross-sectional view taken on the line II—II of Figure 1; and Figure 3 is an enlarged fragmentary detail view of a portion of the welder head.

Referring now more particularly to the drawings, there is shown welding apparatus which except for my improvement presently to be described may be conventional. The welding apparatus comprises a supporting structure not shown in detail because it is conventional and does not constitute my invention, the supporting structure including uprights 2 and rollers 3 supporting and guiding for oscillating movement in the direction of its length a beam 4 carrying a welder head designated generally by reference numeral 5. Oscillation of the beam 4 moves the welder head along a joint to be welded and returns the welder head to the starting point ready for the next welding operation. The beam may be oscillated by any appropriate mechanism, there being shown in the drawings a screw 6 journaled for rotation in the uprights 2 and passing through and in threaded engagement with a nut 7 carried by and fixedly positioned relatively to the beam 4. The screw may be selectively rotated in either direction, as by mechanism including a reversible electric motor 8, a gear reducer 9 and a sprocket drive 10, all as well known to those skilled in the art.

The work is shown in Figure 2 and consists of two sheared sheet edges 11 and 12 which are shown as being maintained in place in contiguous relationship at a welding station. The sheets may be steel sheets, for example, high silicon steel sheets. The sheet edges are supported upon an anvil 13 and are clamped in place against the anvil by clamping members 14 and 15 pivotally mounted at 16 and 17 respectively. The clamping members 14 and 15 may be operated in any appropriate manner to clamp the sheets in place against the anvil 13 for welding and to release the sheets after the welding has been completed. So far as the present invention is concerned the details of the clamping members may vary widely. The clamping means has particular advantages whether used in connection with the invention claimed in the present application or not and is claimed in copending application Serial No. 220,246, filed April 10, 1951.

The sheet edges 11 and 12 are shown as being clamped in position at the welding station in contact with each other although on occasion it may be desired to space the edges slightly apart. In either event the edges are contiguous and properly relatively positioned for welding. The sheet edges have irregularities in the form of projecting shear fins which if not reduced would seriously interfere with the formation of a perfect uniform weld.

The welder head 5 has an electrode 18 which may be conventional and which cooperates with the work and with electrical connections through the anvil for electrically welding together the sheet edges 11 and 12 as the welder head advances along the joint in the operative direction. All this is well known to those skilled in the art and hence is not shown or described in detail.

Pivoted to the welder head at 19 is a carrier 20 in the form of a generally L-shaped lever having its long arm 21 generally horizontal and its short arm 22 extending generally downwardly from the forward end of the long arm 21 and having journaled therein at 23 a roller 24. The roller 24 is positioned directly in front of the electrode 18 as the welder head advances in its operative direction, to wit, from right to left viewing Figure 1.

The roller 24 is moved between operative and inoperative positions by turning the carrier 20 about its pivot 19. Journaled in the head is a shaft 25 carrying a semi-cylindrical cam 26, the shaft having fastened thereto an operating handle 27. The operating handle 27 is manually movable to turn the shaft 25 through an angle of approximately 90°, i. e., between a position in which the flat face of the cam 26 is generally upright and a position in which the flat face of the cam is generally horizontal and facing upwardly. When the cam is in generally upright position as shown in Figure 3 the carrier 20 is turned to the fullest extent in the counterclockwise direction about the pivot 19 to press the roller 24 down against the work. When the cam 26 is positioned with its flat face generally horizontal and facing upwardly the right-hand end of the long arm 21 of the carrier 20 viewing Figure 3 is permitted to move downwardly which it does through the action of gravity (although spring means may be provided if desired), raising the roller 24 out of contact with the work.

As the welder head begins to advance from right to left on an operative stroke to weld together the sheet edges 11 and 12 the operator operates the handle 27 to position the cam 26 with its flat face generally upright as shown in Figure 3 which moves the roller 24 downwardly to press against the work. The roller straddles the joint between the sheet edges 11 and 12 and precedes the electrode 18 as the welder head advances. The roller 24 reduces by pressure or rolls down the shear fins on the sheet edges 11 and 12. This is accomplished whether the shear fins project upwardly or downwardly from the edges as in either case they are forced generally into the plane of the sheets by the pressure created on the edges between the roller 24 and the anvil 13. Since the roller precedes the electrode 18 the reduction of the shear fins is accomplished progressively but always ahead of the welding operation. While it is possible if desired to roll down the shear fins in one pass or stroke of the welder head and weld the sheets together in another pass or stroke I prefer to accomplish both functions in the same pass, welding the edges together immediately following rolling down thereof by the roller 24. On the return or inoperative stroke of the welder head the handle 27 is turned to permit the roller 24 to rise above the work as above described so that it does not engage the work.

The utilization of the roller 24 results in the formation of an unprecedentedly clean uniform weld not requiring any after operation such as trimming or rolling. The weld connects the sheet edges to form a joint which is of substantially uniform thickness equal to the thickness of the sheets so that except for a difference in color and surface texture it would be difficult to discern the weld.

While I have shown and described a present preferred embodiment of the invention and have illustrated a present preferred method of practicing the same it is to be distinctly understood that the invention is not limited thereto but may be otherwise variously embodied within the scope of the following claims.

I claim:

1. A method of bonding together metal sheet edges, at least one of which edges is a sheared edge having shear fins projecting outwardly beyond the plane of a face of the sheet, comprising disposing the edges stationarily in juxtaposition upon a continuous flat supporting surface extending parallel to the edges throughout the full extent of the edges, engaging by a presser the edges at the faces of the sheets disposed away from said surface and pressing the same toward said surface throughout the full extent of the edges, thereby reducing the shear fins, and bonding together the edges.

2. A method of bonding together metal sheet edges, at least one of which edges is a sheared edge having shear fins projecting outwardly beyond the plane of a face of the sheet, comprising disposing the edges stationarily in juxtaposition upon a continuous flat supporting surface extending parallel to the edges throughout the full extent of the edges, engaging the edges at the faces of the sheets disposed away from said surface and pressing the same toward said surface throughout the full extent of the edges by a roller rolling along the edges and urged toward said surface, thereby reducing the shear fins, and bonding together the edges.

3. A method of bonding together metal sheet edges, at least one of which edges is a sheared edge having shear fins projecting outwardly beyond the plane of a face of the sheet, comprising disposing the edges stationarily in juxtaposition upon a continuous flat supporting surface extending parallel to the edges throughout the full extent of the edges and in a single pass reducing the shear fins by progressively along the edges pressing the edges toward said surface and bonding together the edges.

4. Apparatus for bonding together metal sheet edges, at least one of which edges is a sheared edge having shear fins projecting outwardly beyond the plane of a face of the sheet, comprising a continuous flat supporting surface extending parallel to the edges throughout the full extent of the edges upon which the edges are adapted to be stationarily disposed in juxtaposition, a presser adapted to engage the edges at the faces of the sheets disposed away from said surface to press the same toward said surface throughout the full extent of the edges and thereby reduce the shear fins and means for bonding together the edges while disposed in juxtaposition upon said surface.

References Cited in the file of this patent

UNITED STATES PATENTS

| | | |
|---|---|---|
| 1,085,639 | Snodgrass | Feb. 3, 1914 |
| 1,339,967 | Murray et al. | May 11, 1920 |
| 1,665,815 | Mauser | Apr. 10, 1928 |
| 1,976,343 | Heineman | Oct. 9, 1934 |
| 2,220,545 | Reinhardt | Nov. 5, 1940 |
| 2,403,221 | Howard | July 2, 1946 |